United States Patent
Kwak

(10) Patent No.: US 11,613,311 B2
(45) Date of Patent: Mar. 28, 2023

(54) RADIATOR SUPPORT ASSEMBLY

(71) Applicants: Hyundai Motor Company, Seoul (KR); Kia Corporation, Seoul (KR)

(72) Inventor: Kyung Tae Kwak, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/404,806

(22) Filed: Aug. 17, 2021

(65) Prior Publication Data

US 2022/0212724 A1    Jul. 7, 2022

(30) Foreign Application Priority Data

Jan. 6, 2021   (KR) .................. 10-2021-0001235

(51) Int. Cl.
B62D 25/08   (2006.01)
B60K 11/04   (2006.01)
B62D 27/06   (2006.01)

(52) U.S. Cl.
CPC ............ B62D 25/084 (2013.01); B60K 11/04 (2013.01); B62D 27/065 (2013.01)

(58) Field of Classification Search
CPC .... B62D 25/084; B62D 27/065; B60K 11/04; B60Y 2304/03; B60Y 2304/05
See application file for complete search history.

(56) References Cited

U.S. PATENT DOCUMENTS

| | | | |
|---|---|---|---|
| 2004/0160784 A1* | 8/2004 | Park ...................... | B62D 65/16 362/549 |
| 2005/0082140 A1* | 4/2005 | Kim ..................... | B62D 25/084 193/9 |
| 2006/0009088 A1* | 1/2006 | Uchiyama ............ | B62D 25/084 439/821 |
| 2007/0182211 A1* | 8/2007 | Sub ...................... | B62D 29/001 296/193.09 |
| 2013/0161979 A1* | 6/2013 | Abe ....................... | B62D 25/08 296/193.09 |
| 2016/0236562 A1* | 8/2016 | Iwamoto ............... | B60K 11/04 |
| 2019/0111774 A1* | 4/2019 | Fukuoka ................ | B62D 21/02 |

FOREIGN PATENT DOCUMENTS

| | | | | |
|---|---|---|---|---|
| CN | 1636818 A | * | 7/2005 | ........... B62D 25/084 |
| EP | 1266818 A2 | * | 12/2002 | ............. B60R 19/12 |
| EP | 1726470 A1 | * | 11/2006 | ............. B60K 11/04 |
| EP | 1923300 A2 | * | 5/2008 | ............. B60K 11/04 |
| EP | 2067690 A1 | * | 6/2009 | ........... B62D 25/084 |
| EP | 2301825 A2 | * | 3/2011 | ........... B62D 25/084 |
| EP | 2394885 A1 | * | 12/2011 | ............. B60K 11/04 |

(Continued)

*Primary Examiner* — Hung Q Nguyen
(74) *Attorney, Agent, or Firm* — Morgan, Lewis & Bockius LLP

(57) ABSTRACT

A radiator support assembly may include a radiator support upper member including an upper internal surface, a radiator support side member including a side internal surface and provided in pairs, and a radiator support lower member including a lower internal surface, wherein the radiator support upper member, the radiator support side member and the radiator support lower member are joined so that the upper internal surface, the side internal surface and the lower internal surface form a single closed-loop.

11 Claims, 12 Drawing Sheets

(56) References Cited

FOREIGN PATENT DOCUMENTS

| EP | 3233609 B1 * | 8/2019 | ............ B62D 25/084 |
| FR | 3014813 A1 * | 6/2015 | ............ B62D 25/084 |
| KR | 970010582 B1 * | 6/1997 | |
| WO | WO-2007145039 A1 * | 12/2007 | ............. B60K 11/04 |
| WO | WO-2009072673 A1 * | 6/2009 | ............ B62D 25/084 |
| WO | WO-2016117252 A1 * | 7/2016 | ............. B62D 25/08 |

* cited by examiner

RADIATOR SUPPORT ASSEMBLY

CROSS-REFERENCE TO RELATED APPLICATION

The present application claims priority to Korean Patent Application No. 10-2021-0001235 filed on Jan. 6, 2021, the entire contents of which is incorporated herein for all purposes by this reference.

BACKGROUND OF THE INVENTION

Field of the Invention

The present invention relates to a radiator support assembly. More particularly, the present invention relates to a radiator support assembly that can reduce the entire weight and increase strength.

Description of Related Art

A radiator support is a component that welds parts such as bumpers and lamps with a separate bracket for mounting parts.

The rigidity required for the side members of the radiator support assembly is disadvantageous because it is formed in a front or rear open cross section in the front and rear direction or cross-sectional structure of the vehicle body.

Furthermore, the strength of the connection may deteriorate due to the lack of continuity between the cross-sections of the side member, upper member and lower member.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a radiator support upper member assembly that can reduce manufacturing cost and weight.

A radiator support assembly according to various exemplary embodiments of the present invention may include a radiator support upper member including an upper internal surface, a radiator support side member including a side internal surface and provided in pairs, and a radiator support lower member including a lower internal surface, wherein the radiator support upper member, the radiator support side member and the radiator support lower member are joined so that the upper internal surface, the side internal surface and the lower internal surface form a single closed-loop.

The upper internal surface, the side internal surface and the lower internal surface may be disposed toward the center of the closed-loop.

The radiator supports upper member and the radiator support side member joined to both end portions thereof may be partially overlapped and joined to each other, and the radiator support lower member and the radiator support side member joined to both end portions thereof may be partially overlapped and joined.

The radiator support upper member may further include an upper side surface curved from the upper internal surface, extending in a longitudinal direction thereof, and forming an upper connection portion together with the upper internal surface, and an upper end portion of the radiator support side member may be inserted into the upper connection portion.

The radiator support side member may further include a side member side surface curved on the side internal surface, and the side member side surface may be connected to the upper side surface.

The radiator support upper member may further include an upper external surface connecting the upper side surface, and the radiator support side member may further include a side member upper surface curved in the side internal surface to be connected to the upper external surface.

The radiator support side member may further include a side flange which is curved on the side member side surface and engages with a radiator side front member.

The radiator support assembly according to various exemplary embodiments of the present invention may further include a side upper reinforcement member configured to support the radiator support side member and an upper portion of the radiator side front member.

The radiator support assembly according to various exemplary embodiments of the present invention may further include a side lower reinforcement member configured to support the radiator support side member and a lower portion of the radiator side front member.

The radiator support lower member may further include a lower member side surface which is curved from the lower internal surface and forms a lower connection portion together with the lower internal surface, and a lower end portion of the radiator support side member may be inserted and connected to the lower connection portion.

The lower end portion of the radiator support side member may include an end internal surface which is curved on the side internal surface and connected to the lower internal surface, and an end side surface curved from the end internal surface and connected to the lower member side surface.

The radiator support lower member may further include a lower flange curved on the lower member side surface, and the lower end portion of the radiator support side member may further include an end flange which is curved on the end side surface and engages with the lower flange.

According to the radiator support upper member assembly according to various exemplary embodiments of the present invention, manufacturing cost and weight may be reduced while increasing strength by dispose and connection of the configuration.

Furthermore, the effects obtained or predicted due to various exemplary embodiments of the present invention will be included directly or implicitly in the detailed description of various exemplary embodiments of the present invention. That is, various effects predicted according to various exemplary embodiments of the present invention will be included within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
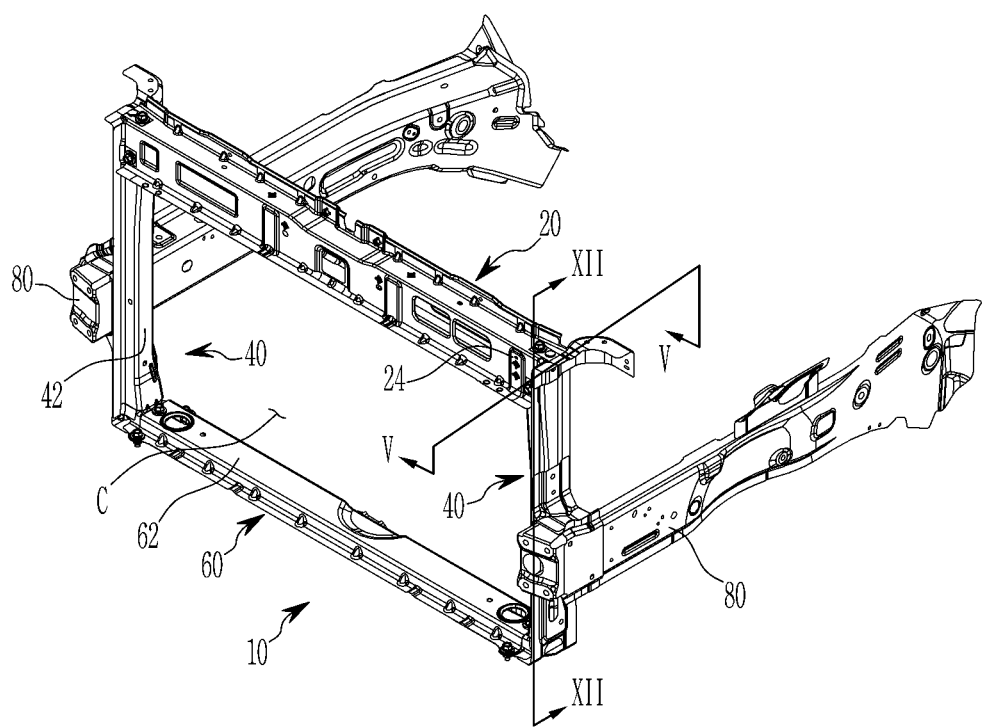
FIG. 1 is a perspective view of a radiator support assembly according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Parts indicated by the same reference numerals throughout the specification refer to the same components.

In the drawings, the thickness of layers, films, panels, regions, etc., are exaggerated for clarity.

When a part such as a layer, film, region, or plate is said to be "on" another part, the present includes not only the case directly above the other part, but also the case where there is another part in the middle.

In contrast, when an element is referred to as being "directly on" another element, there are no intervening elements present.

Throughout the specification, when a part "includes" a certain component, it means that other components may be further included rather than excluding other components unless specifically stated to the contrary.

Various exemplary embodiments of the present invention will hereinafter be described in detail with reference to the accompanying drawings.

FIG. 1 is a perspective view of a radiator support assembly according to various exemplary embodiments of the present invention.

Referring to FIG. 1, a radiator support assembly 10 according to various exemplary embodiments of the present invention includes a radiator support upper member 20, a radiator support side member 40 provided in pairs and a radiator support lower member 60.

Figure 2:
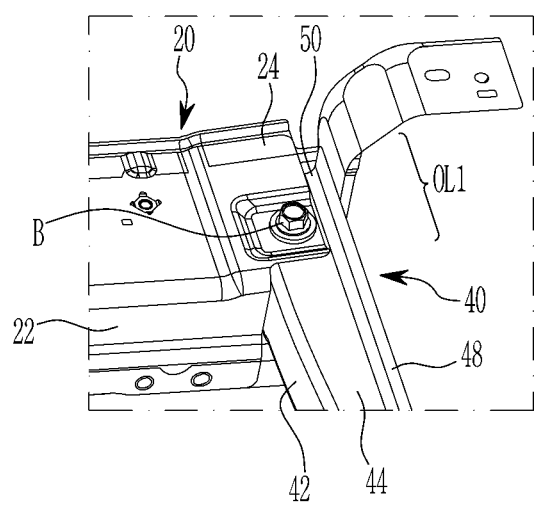
FIG. 2 is a drawing showing a combination of a radiator support upper member and a radiator support side member of a radiator support assembly according to various exemplary embodiments of the present invention.
Figure 3:
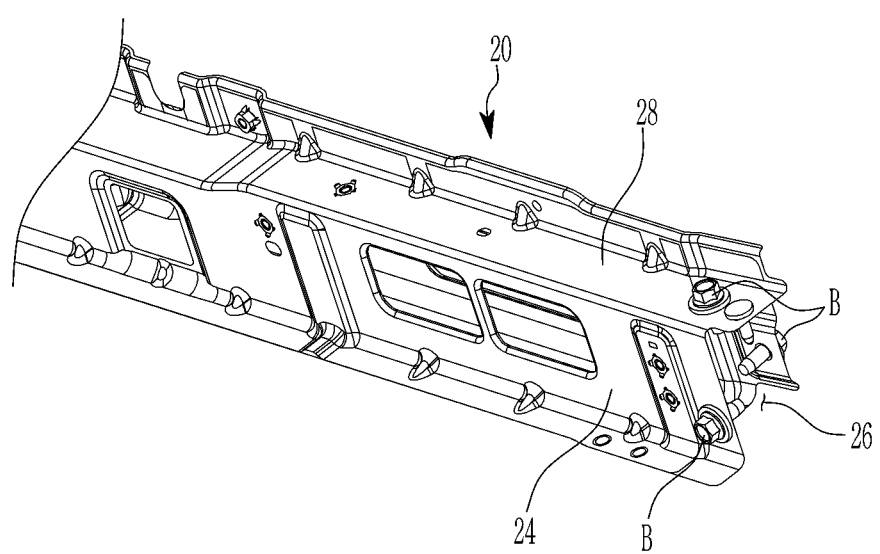
FIG. 3 is a partial perspective view of a radiator support upper member of a radiator support assembly according to various exemplary embodiments of the present invention.

FIG. 2 is a drawing showing a combination of a radiator support upper member and a radiator support side member of a radiator support assembly according to various exemplary embodiments of the present invention, and FIG. 3 is a partial perspective view of a radiator support upper member of a radiator support assembly according to various exemplary embodiments of the present invention.

Figure 4:
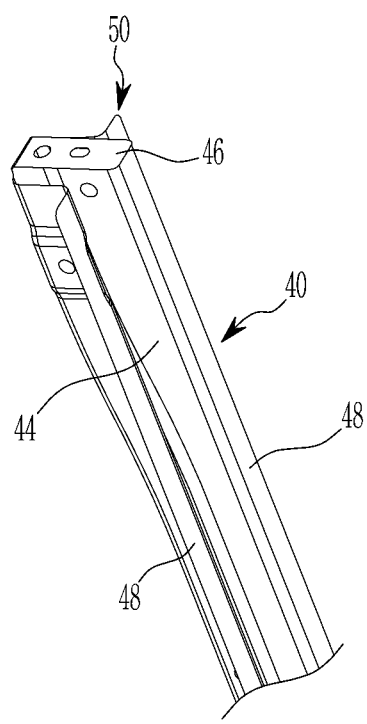
FIG. 4 is a partial perspective view of a radiator support side member of a radiator support assembly according to various exemplary embodiments of the present invention.
Figure 5:
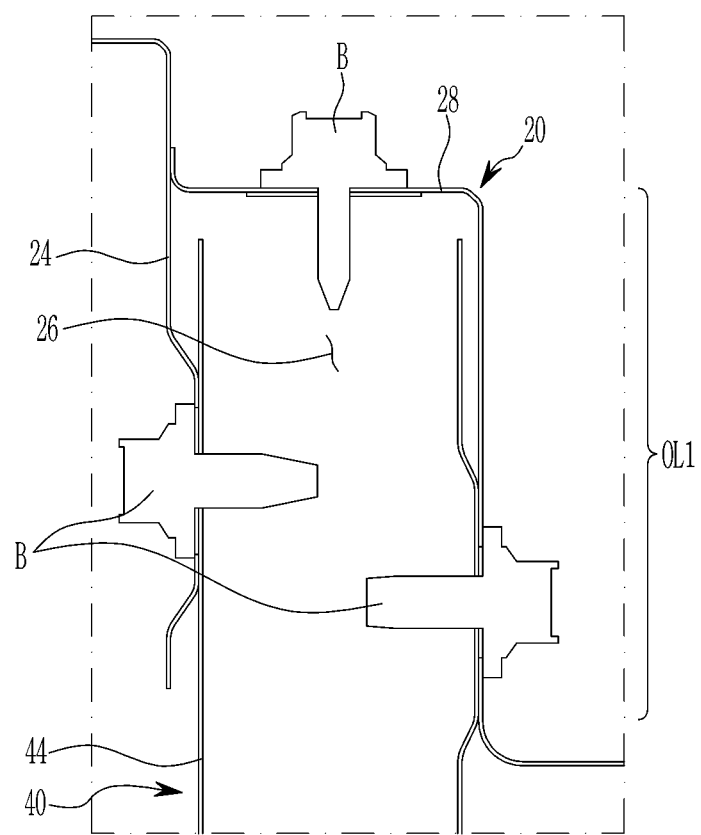
FIG. 5 is a cross-sectional view along the V-V line of FIG. 1.

FIG. 4 is a partial perspective view of a radiator support side member of a radiator support assembly according to various exemplary embodiments of the present invention, and FIG. 5 is a cross-sectional view along the V-V line of FIG. 1.

Referring to FIG. 1 to FIG. 5, a combination of a radiator support upper member and a radiator support side member of a radiator support assembly according to various exemplary embodiments of the present invention is described.

The radiator support upper member 20 and the radiator support side member 40 coupled to both end portions thereof may be partially overlapped to form an upper overlap portion OL1 coupled thereto.

The radiator support upper member 20 may further include an upper internal surface 22 disposed toward the internal side C of the radiator support assembly 10, and an upper side surface 24 which is curved from the upper internal surface 22, is formed extending in a longitudinal direction thereof, and forms an upper connection portion 26 together with the upper internal surface 22.

The radiator support side member 40 may further include a side member side surface 44 curved in the side internal surface 42, and the side member side surface 44 may engage the upper side surface 24.

The upper end portion 50 of the radiator support side member 40 may be inserted into the upper connection portion 26 to be coupled. The upper connection portion 26 is defined as the space formed by the upper side surface 24 formed to extend in the longitudinal direction of the radiator support upper member 20 rather than the upper internal surface 22, and the upper internal surface 22 and the upper end portion 50 of the radiator support side member 40 is inserted into the upper connection portion 26 so that it may be firmly coupled.

The upper connection portion 26 and the upper end portion 50 of the radiator support side member 40 are combined to form the upper overlap portion OL1, so that the radiator support upper member 20 and the radiator support side member 40 may be more firmly combined. That is, a portion of the upper side surface 24 and a portion of the side member side surface 44 form the upper overlap portion OL1, so that a firm connection is possible.

The radiator support side member 40 includes a side internal surface 42 disposed toward the inside C of the radiator support assembly 10. As the upper internal surface 22 and the side internal surface 42 contact each other, the load distribution in the up and down directions and the width direction of the radiator support assembly 10 is possible.

The radiator support upper member 20 may further include an upper external surface 28 connecting the upper side surface 24, the radiator support side member 40 may further include a side member upper surface 46 curved in the side internal surface 42 to engage the upper external surface 28.

The radiator support upper member 20 and the radiator support side member 40, as shown in FIG. 5, may be joined by bolts B on each of the three sides, or by welding.

Without a separate bracket connecting the radiator support upper member 20 and the radiator support side member 40, the radiator support upper member 20 and the radiator support side member 40 may be connected to reducing the number of parts and weight. Furthermore, it is possible to combine on each of the three sides, allowing for a rigid connection.

Figure 6:
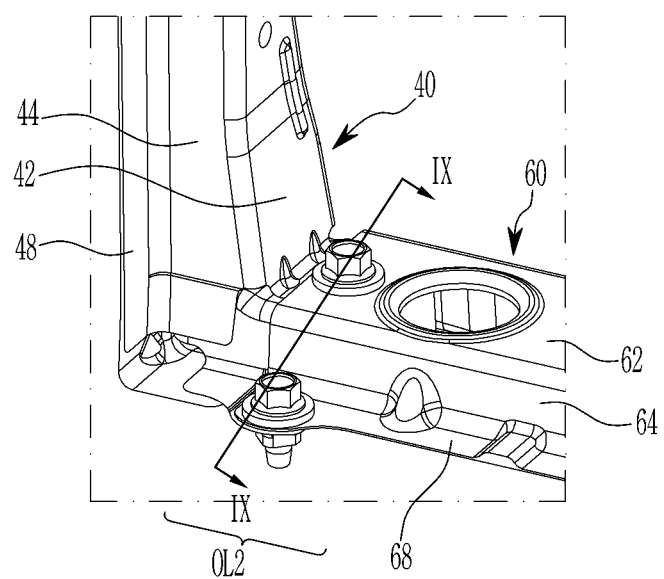
FIG. 6 is a drawing showing a combination of a radiator support side member and a radiator support lower member of a radiator support assembly according to various exemplary embodiments of the present invention.
Figure 7:
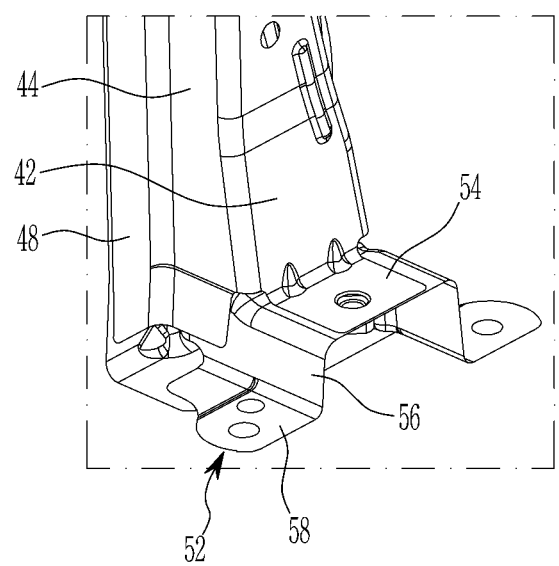
FIG. 7 is a partial perspective view of a radiator support side member of a radiator support assembly according to various exemplary embodiments of the present invention.

FIG. 6 is a drawing showing a combination of a radiator support side member and a radiator support lower member of a radiator support assembly according to various exemplary embodiments of the present invention, and FIG. 7 is a partial perspective view of a radiator support side member of a radiator support assembly according to various exemplary embodiments of the present invention.

Figure 8:
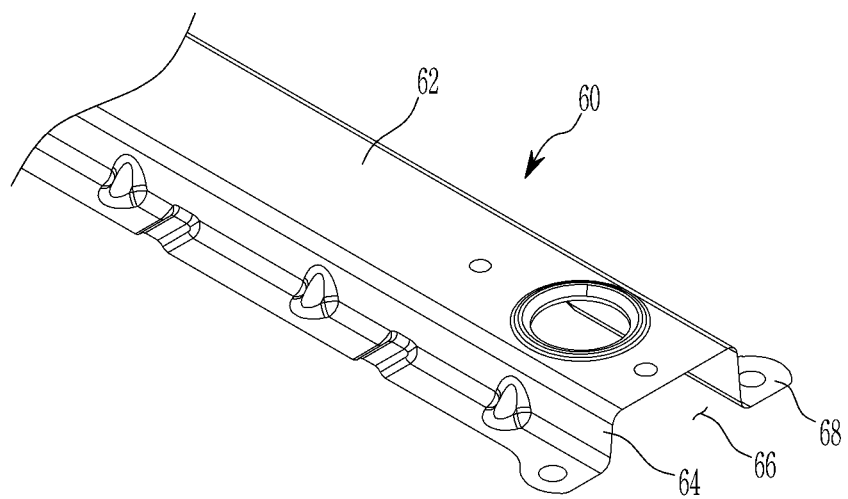
FIG. 8 is a partial perspective view of a radiator support lower member of a radiator support assembly according to various exemplary embodiments of the present invention.
Figure 9:
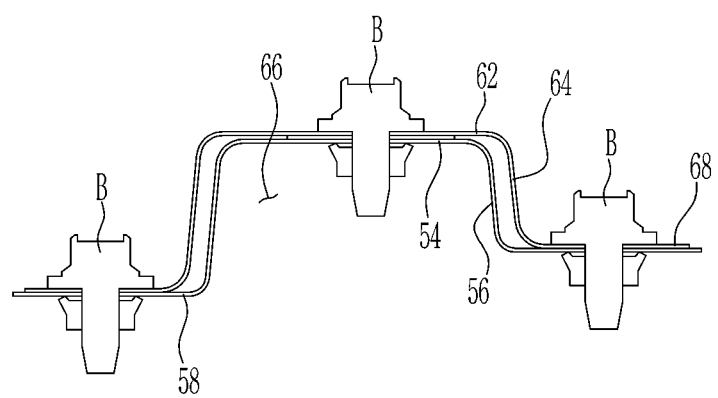
FIG. 9 is a cross-sectional view along line IX-IX of FIG. 6.

FIG. 8 is a partial perspective view of a radiator support lower member of a radiator support assembly according to various exemplary embodiments of the present invention, and FIG. 9 is a cross-sectional view along line IX-IX of FIG. 6.

Referring to FIG. 1 and FIG. 6 to FIG. 9, the connection of a radiator support side member and a radiator support lower member of a radiator support assembly according to various exemplary embodiments of the present invention is described.

The radiator support lower member 60 includes a lower internal surface 62 disposed toward the internal side C of the radiator support assembly 10, and a lower member side surface 64 formed curved from the lower internal surface 62 and forming a lower connection portion 66 together with the lower internal surface 62. The lower end portion 52 of the radiator support side member 40 may be inserted into the lower connection portion 66 to engage therewith.

The lower end portion 52 of the radiator support side member 40 may further include an end internal surface 54 which is bent at the side internal surface 42 and connected to the lower internal surface 62, and an end side surface 56 curved from the end internal surface 54 and connected to the lower member side surface 64.

The lower end portion 52 of the radiator support side member 40 may be inserted into the lower connection portion 66 to engage therewith.

That is, the radiator support lower member 60 and the radiator support side member 40 coupled to both end portions thereof form a lower overlap portion OL2 which is partially overlapped and coupled and the radiator support lower member 60 and the radiator support side member 40 may be combined without a separate bracket, reducing the number of parts and weight.

The radiator support lower member 60 further includes a lower flange 68 curved in the lower member side surface 64, and the lower end portion 52 of the radiator support side member 40 further includes an end flange 58 which is curved on the end side surface 56 and engages with the lower flange 68.

As shown in FIG. 9, the lower internal surface 62 and the end internal surface 54 are joined, and the lower flange 68 and the end flange 58 are joined, so that the radiator support lower member 60 and the radiator support side member 40 may be joined without a separate bracket, etc, so that the number of parts and weight may be reduced.

Furthermore, the radiator support lower member 60 and the radiator support side member 40 may be joined on three sides with bolts B, or may be joined through welding.

Figure 10:
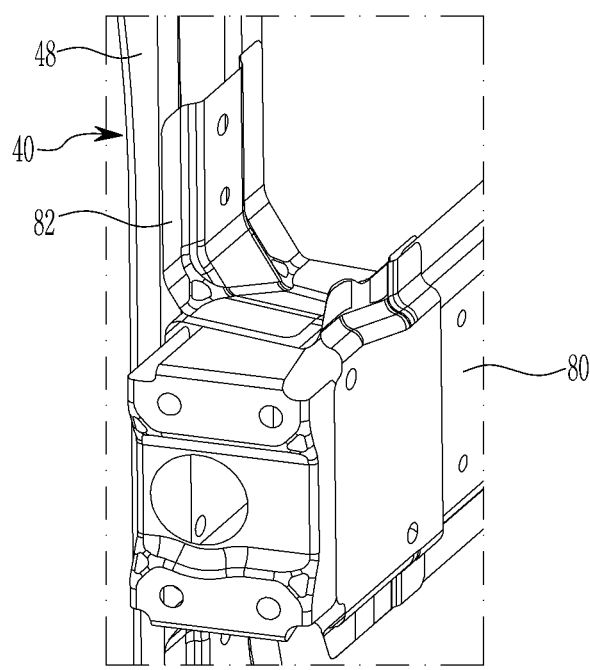
FIG. 10 and FIG. 11 is a drawing showing a combination of a radiator support side member and a radiator side front member of a radiator support assembly according to various exemplary embodiments of the present invention.
Figure 11:
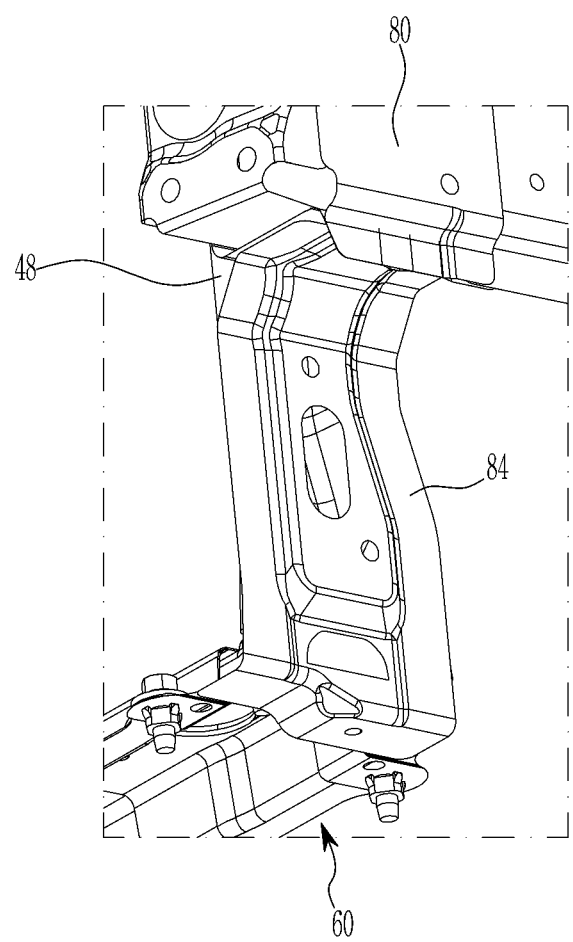
Figure 12:
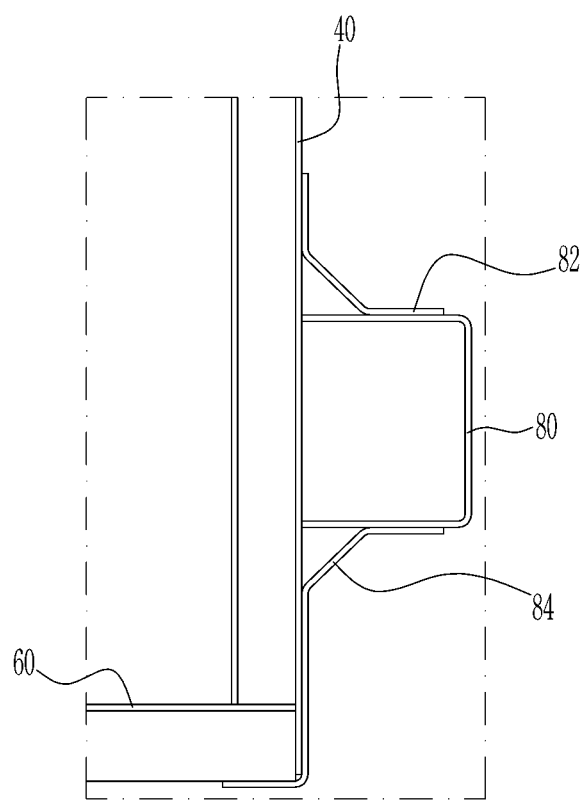
FIG. 12 is a cross-sectional view along the XXII-XII line of FIG. 1.

FIG. 10 and FIG. 11 is a drawing showing a combination of a radiator support side member and a radiator side front member of a radiator support assembly according to various exemplary embodiments of the present invention, and FIG. 12 is a cross-sectional view along the XXII-XII line of FIG. 1.

Referring to FIG. 1 and FIG. 10, FIG. 11, and FIG. 12, the connection of a radiator support side member and a radiator side front member of a radiator support assembly according to various exemplary embodiments of the present invention is described.

The radiator support side member 40 may further include a side flange 48 which is curved on the side member side surface 44 to engage the radiator side front member 80. Through the side flange 48, the radiator support side member 40 and the radiator side front member 80 may be combined without a separate bracket, so that the number of parts and weight can be reduced.

The radiator support assembly 10 according to various exemplary embodiments of the present invention may further include a side reinforcement member supporting the radiator support side member 40 and the radiator side front member 80.

In an exemplary embodiment of the present invention, the side reinforcement member of the radiator support assembly 10 may include a side upper reinforcement member 82 supporting the radiator support side member 40 and the upper portion of the radiator side front member 80.

In an exemplary embodiment of the present invention, the side reinforcement member of the radiator support assembly 10 may further include a side lower reinforcement member 84 supporting the radiator support side member 40 and the lower portion of the radiator side front member 80.

By use of the side upper reinforcement member 82 and the side lower reinforcement member 84, the coupling of the radiator support side member 40 and the radiator side front member 80 may be made more rigid.

In the radiator support assembly 10 according to various exemplary embodiments of the present invention, the radiator support upper member 20, the radiator support side member 40 and the radiator support lower member 60 are combined so that the upper internal surface 22, the side internal surface 42 and the lower internal surface 62 are in contact with each other to form a closed-loop. That is, the upper internal surface 22, the side internal surface 42 and the lower internal surface 62 may be disposed toward the center of the closed-loop, and through this, the continuity of the cross-section of each member is maintained, so that an effect of distributing the load may be increased.

Furthermore, the upper internal surface 22, the side internal surface 42 and the lower internal surface 62 are disposed toward the center of the closed-loop, so that the moment characteristic for the load can also be improved.

Furthermore, in the radiator support assembly 10 according to various exemplary embodiments of the present invention, the radiator support upper member 20, the radiator support side member 40 and the radiator support lower member 60 may be tightly coupled, so that the noise, vibration, and harshness (NVH) characteristic may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A radiator support assembly comprising:
a radiator support upper member including an upper internal surface;
a radiator support side member including a side internal surface and provided in pairs; and
a radiator support lower member including a lower internal surface,
wherein the radiator support upper member, the radiator support side member and the radiator support lower member are joined so that the upper internal surface, the side internal surface and the lower internal surface form a single closed-loop,
wherein the radiator support upper member further includes an upper side surface curved from the upper internal surface, extending in a longitudinal direction thereof, and forming an upper connection portion together with the upper internal surface,
wherein an upper end portion of the radiator support side member is inserted into the upper connection portion,
wherein the radiator support side member further includes a side member side surface curved on the side internal surface, and
wherein the side member side surface is connected to the upper side surface.

2. The radiator support assembly of claim 1, wherein the upper internal surface, the side internal surface and the lower internal surface are disposed toward a center portion of the closed-loop.

3. The radiator support assembly of claim 1,
wherein the radiator support upper member and the radiator support side member joined to first and second end portions thereof are partially overlapped and joined to each other, and
wherein the radiator support lower member and the radiator support side member joined to first and second end portions thereof are partially overlapped and joined to each other.

4. The radiator support assembly of claim 1,
wherein the radiator support upper member further includes an upper external surface connecting the upper side surface; and
wherein the radiator support side member further includes a side member upper surface curved in the side internal surface to be connected to the upper external surface.

5. The radiator support assembly of claim 1, wherein the radiator support side member further includes a side flange which is curved on the side member side surface and engages with a radiator side front member.

6. The radiator support assembly of claim 5, further including a side reinforcement member configured to support the radiator support side member and the radiator side front member.

7. The radiator support assembly of claim 6, wherein the side reinforcement member includes a side upper reinforcement member configured to support the radiator support side member and an upper portion of the radiator side front member.

8. The radiator support assembly of claim 6, wherein the side reinforcement member includes a side lower reinforcement member configured to support the radiator support side member and a lower portion of the radiator side front member.

9. A radiator support assembly comprising:
a radiator support upper member including an upper internal surface;
a radiator support side member including a side internal surface and provided in pairs; and
a radiator support lower member including a lower internal surface,
wherein the radiator support upper member, the radiator support side member and the radiator support lower member are joined so that the upper internal surface, the side internal surface and the lower internal surface form a single closed-loop,
wherein the radiator support lower member further includes a lower member side surface which is curved from the lower internal surface and forms a lower connection portion together with the lower internal surface, and
wherein a lower end portion of the radiator support side member is inserted and connected to the lower connection portion.

10. The radiator support assembly of claim 9, wherein the lower end portion of the radiator support side member includes:
an end internal surface which is curved on the side internal surface and connected to the lower internal surface; and
an end side surface curved from the end internal surface and connected to the lower member side surface.

11. The radiator support assembly of claim 10, wherein the radiator support lower member further includes a lower flange curved on the lower member side surface, and
wherein the lower end portion of the radiator support side member further includes an end flange which is curved on the end side surface and engages with the lower flange.

* * * * *